(12) United States Patent
Zhang

(10) Patent No.: US 12,345,649 B1
(45) Date of Patent: Jul. 1, 2025

(54) TESLA PHOTOIONIZATION DETECTOR

(71) Applicant: Zhigang Zhang, Irvine, CA (US)

(72) Inventor: Zhigang Zhang, Irvine, CA (US)

( * ) Notice: Subject to any disclaimer, the term of this patent is extended or adjusted under 35 U.S.C. 154(b) by 0 days.

(21) Appl. No.: 19/021,837

(22) Filed: Jan. 15, 2025

(51) Int. Cl.
*G01N 21/71* (2006.01)
*G01N 27/66* (2006.01)

(52) U.S. Cl.
CPC .................................. *G01N 21/71* (2013.01)

(58) Field of Classification Search
CPC ............................... G01N 21/71; G01N 27/66
See application file for complete search history.

(56) References Cited

FOREIGN PATENT DOCUMENTS

CN         111122693      *   5/2020   ............. G05F 1/561

* cited by examiner

*Primary Examiner* — Neel D Shah
(74) *Attorney, Agent, or Firm* — Justin Lampel

(57) ABSTRACT

This invention provides Tesla Photoionization Detector (TPD), which comprises power supply driver board, Tesla coil, gas excitation cell, spectral filter, photosensitive element, amplifying board and data acquisition unit. Tesla coil comprises capacitor, primary and secondary inductance coil. Gas excitation cell is a closed clean cavity made of quartz. The invention uses Tesla coil to compose Tesla Photoionization Detector, utilizing high-frequency high-voltage electromagnetic field generated by Tesla coils, gas to be measured flowing through gas excitation cell is excited into plasma state, meanwhile a specific spectrum is generated. The spectrum of a specific target is collected by spectral filter, then convert spectral signal into electrical signal, which is amplified and processed by data acquisition unit and signal processing to realize detection of gas content. This detector can be used for impurity detection in any background gas. When used in a gas chromatograph, the choice of carrier gas is wider.

5 Claims, 1 Drawing Sheet

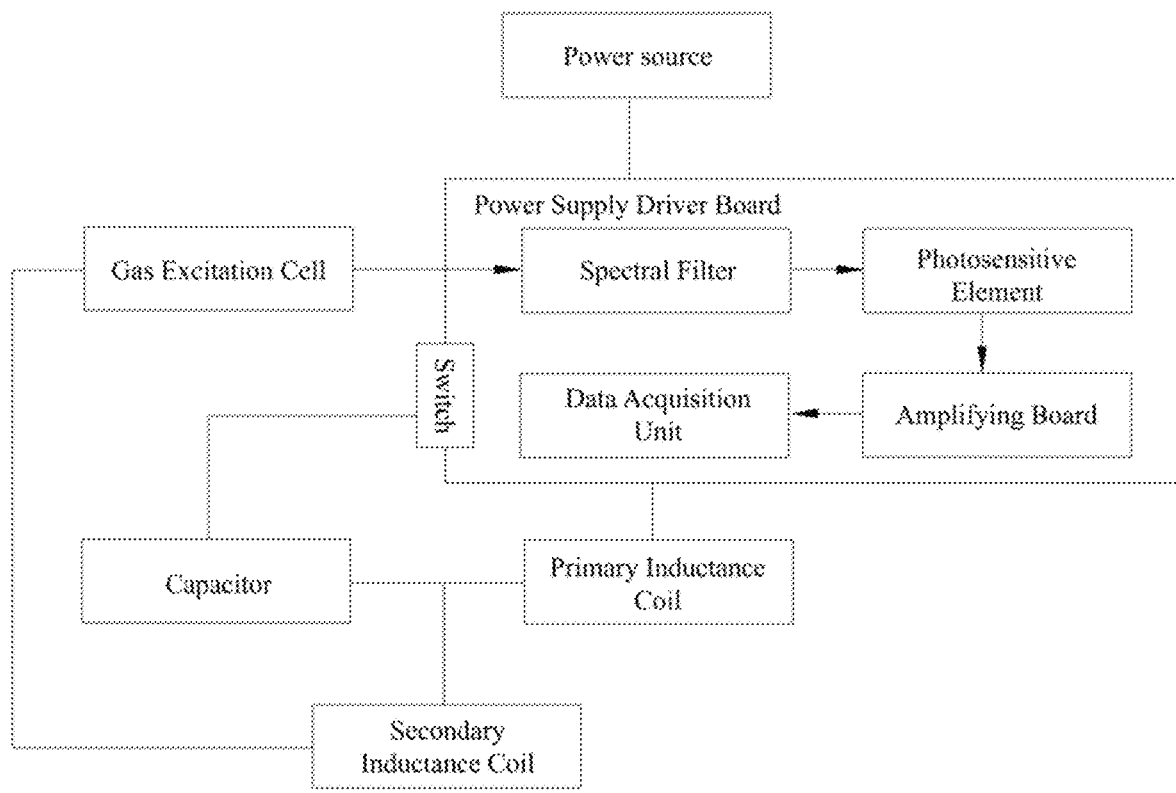

TESLA PHOTOIONIZATION DETECTOR

TECHNICAL FIELD

The present invention relates to the field of photoelectric detectors, in particular to Tesla Photoionization Detector.

BACKGROUND OF THE PRESENT INVENTION

Plasma gas chromatograph filter plasma emission detector (PED) is a kind of universal Detectors with high sensitivity, which has a unique design of quartz cavity loaded with high-frequency high-voltage electric field. When different gas samples pass through the quartz cavity, they are ionized by the high-voltage generator, producing different plasmas. After absorbing energy, plasma produces luminescence phenomenon and emits unique characteristic spectral lines. The emission spectral lines will change with different substances in the carrier gas, thus realizing quantitative analysis of samples.

Traditional Photoionization Detector usually consists of light source, optical path system, detector (such as photodiode, photoresistor, etc.) and signal processing circuit. The light emitted by the light source is focused by the optical path system and projected into the gas to be measured. The optical signal absorbed or scattered by the gas is received by the detector and converted into an electrical signal. Finally, the signal processing circuit is amplified, filtered, analog-to-digital conversion, etc., and finally the gas detection result is obtained. Ultimately the gas detection result is yielded. While traditional Photoionization Detector aim for high sensitivity, they often struggle to maintain good selectivity. In the presence of multiple gases, the detector may be susceptible to interference from other gases, leading to false positives or false negatives.

Therefore, it is necessary to provide Tesla Photoionization Detector to solve the above-mentioned technical problems.

SUMMARY OF PRESENT INVENTION

In order to solve the above technical problems, the present invention provides Tesla Photoionization Detector.

Tesla Photoionization Detector provided by the invention comprises power supply driver board, Tesla coil, gas excitation cell, spectral filter, photosensitive element, amplifying board and data acquisition unit;

Tesla Photoionization Detector comprises capacitor, primary inductance coil and secondary inductance coil, wherein one end of the primary coil is connected with the power supply driver board, the other end of the primary coil is connected with one end of the capacitor, the other end of the capacitor is connected with the switch on the power supply driver board, one end of the secondary coil is connected with the middle or end of the primary coil, the other end of the secondary coil is connected with one end of the gas excitation cell through a high-voltage line, and is used for outputting high-frequency and high-voltage electricity; the other end of gas excitation cell is grounded, and gas molecules in gas excitation cell are stimulated by high-frequency high-voltage electricity, transforming them into plasma and emitting certain spectrum;

The spectral filter is adjacent to gas excitation cell and is used for screening and collecting the optical signal emitted by gas excitation cell;

Photosensitive element receives power supply through power supply pin on power supply driver board, and is used for converting the optical signal output by the spectral filter into an electrical signal;

Amplifying board receives power supply through power supply pin on power supply driver board, and is used for receiving the electrical signal output by the photosensitive element group and amplifying it;

The data acquisition unit receives power supply through power supply pin on power supply driver board, and is used for acquiring, processing and storing the electrical signal data output by amplifying board.

Further, gas excitation cell is a closed clean optical cavity, and the gas to be measured flows through gas excitation cell and is excited into a plasma state by high-frequency high-voltage electricity.

Further, the low-voltage power supply negative terminal of power drive board is connected to a power source, and the low-voltage power supply positive terminal on power drive board is connected to one end of primary coil.

Further, the power supply driver board is further provided with sensor for detecting the temperature and air pressure in the gas excitation cell.

Further, the edge of gas excitation cell is sealed by using of O-rings or metal gasket pairs.

Compared with the related arts, Tesla Photoionization Detector provided by the present invention has the following beneficial effects:

1. The invention uses Tesla coil to form photoelectric gas detector, uses a high-frequency high-voltage electromagnetic field generated by the Tesla coil to excite the gas, the high-frequency voltage and high-energy ions generated by the Tesla coil help to promote the ionization process of the gas, change the movement trajectory of the ions in the gas to be measured, thereby enhancing the selectivity of the target gas, generating a specific spectrum and collecting spectral signals, realizing the detection of impurities in the mixed gas, and can be used for the detection of impurities in any background gas.

BRIEF DESCRIPTION OF THE DRAWINGS

FIG. 1 is a connection block diagram of Tesla Photoionization Detector provided by the present invention.

DETAILED DESCRIPTION OF THE EMBODIMENT'S

The invention will be further described below with reference to the drawings and embodiments.

Referring to FIG. 1, there is a connection block diagram of Tesla Photoionization Detector provided by the present invention.

It should be noted that the embodiments and features in the embodiments in the present application may be combined with each other as long as there is no conflict. Hereinafter, the present invention will be described in detail with reference to the drawings in conjunction with embodiments. It should be noted that the following detailed description is illustrative and is intended to further illustrate the present application. Unless otherwise indicated, all technical and scientific terms used herein have the same meaning as commonly understood by one of ordinary skill in the art to which this application belongs.

For ease of description, spatially relative terms, such as "on," "above," "on the upper surface," "above," etc., may be used herein to describe the spatial positional relationship of one device or feature to other devices or features as shown in the figures, it being understood that spatially relative terms are intended to include different orientations in use or operation other than the orientations of the devices depicted in the figures, for example, if the devices in the figures are inverted, A device described as "above" or "above" another device or configuration will then be positioned as "below" or "below" another device or configuration. Accordingly, the exemplary term "above" may include both orientations "above" and "below", and the device may be positioned in other different ways (rotated 90 degrees or in other orientations), and the spatial relative description used herein is interpreted accordingly.

Embodiment 1

In the specific implementation process, as shown in FIG. 1, Tesla Photoionization Detector includes power supply driver board, Tesla coil, gas excitation cell, spectral filter, photosensitive element, amplifying board and data acquisition unit, wherein ow-voltage power supply negative terminal of power drive board is connected to a power source, and low-voltage power supply positive terminal on power drive board is connected to one end of primary coil;

Tesla coil comprises capacitor, primary inductance coil and secondary inductance coil, wherein one end of the primary coil is connected with power supply driver board, the other end of primary coil is connected with one end of capacitor, the other end of capacitor is connected with a switch on power supply driver board, one end of secondary coil is connected with the middle or end of primary coil, the other end of secondary coil is connected with one end of gas excitation cell through a high-voltage line, and is used for outputting high-voltage electricity, the other end of gas excitation cell is grounded. The gas molecules within the excitation cell are excited into a plasma state under the influence of a high-frequency electromagnetic field, resulting in the generation of specific spectral emissions as the gas flows through.

The spectral filter is adjacent to the output end of gas excitation cell, and is used for screening and collecting the light signal emitted the gas excitation cell, and only allows light of a specific wavelength or band to pass through;

The photosensitive element (photodiode) receives power supply through power supply pin on power supply driver board, and is used to convert the optical signal output by the spectral filter into an electrical signal;

Amplifying board receives power supply through power supply pin on power supply driver board, and is used for receiving the electrical signal output by photosensitive element group and amplifying it;

The data acquisition unit receives power supply through power supply pin on power supply driver board, and is used for acquiring, processing and storing the electric signal data output by amplifying board.

Further, the power supply driver board is also provided with a sensor for detecting the temperature and the air pressure in gas excitation cell.

Embodiment 2

In one embodiment, gas excitation cell is a closed optical cavity. The material of optical cavity is selected with high light transmittance and low absorption characteristics (e.g. quartz glass, fused silica), and the surface is smooth and flawless. In order to prevent external air or impurities from entering the cavity and interfering with the measurement results, the edge of optical cavity can be sealed by using O-rings, metal gaskets or other forms of sealing.

The working principle of Tesla Photoionization Detector is as follows: the working flow of the Tesla Photoionization Detector starts from power supply driver board, generates a high-voltage electric field through Tesla coil to excite gas molecules to emit light, then selectively transmits the characteristic spectrum emitted by the target gas by spectral filter, then the optical signal is converted into an electric signal by photosensitive element, and the signal amplitude is enhanced by amplifying board, and finally the signal is digitized and saved by data acquisition unit.

The circuit and the control according to the present invention are related to the prior art, and will not be described in detail here.

From the above description of the embodiments, those skilled in the art can clearly understand that each embodiment can be implemented by software and a general hardware platform, and of course, it can also be implemented by hardware. Based on this understanding, the above-described technical solutions essentially or contribute to related technologies may be embodied in the form of software products, which may be stored in a computer-readable storage medium, such as ROM/RAM, magnetic disk, optical disk, etc. Several instructions are included to cause a computer device (which may be a personal computer, server, or network device, etc.) to perform the methods described in various embodiments or portions of the embodiments.

Having shown and described the basic principles and main features of the present invention and the advantages of the present invention, it will be apparent to those skilled in the art that the present invention is not limited to the details of the above-described exemplary embodiments, but that the present invention can be implemented in other specific forms without departing from the spirit or essential features of the present invention. Accordingly, the embodiments are to be regarded as exemplary and non-limiting in all respects, and the scope of the invention is defined by the appended claims rather than the foregoing description, and it is therefore intended that all changes falling within the meaning and scope of the equivalents of the claims be encompassed within the invention, and any reference signs in the claims should not be construed as limiting the claims to which they are referred.

In addition, it should be understood that although the present specification is described in terms of embodiments, not each embodiment includes only one independent technical solution, and this description of the specification is for the sake of clarity only, and those skilled in the art should regard the specification as a whole, and the technical solutions in each embodiment may be appropriately combined to form other embodiments that can be understood by those skilled in the art.

The invention claimed is:

1. Tesla Photoionization Detector is characterized by comprising power supply driver board, Tesla coil, gas excitation cell, spectral filter, photosensitive element, amplifying board and data acquisition unit;

the Tesla coil comprises capacitor, primary inductance coil and secondary inductance coil, wherein one end of primary coil is connected with power supply driver board, the other end of primary coil is connected with one end of capacitor, the other end of capacitor is connected with a switch on power supply driver board, one end of secondary coil is connected with the middle or end of primary coil, and the other end of secondary coil is connected with one end of gas excitation cell through a high-voltage line for outputting high frequency high voltage electricity, the other end of gas excitation cell is grounded, and gas molecules in gas excitation cell are stimulated by high frequency high voltage electricity, transforming them into plasma and emitting spectrum;

spectral filter is adjacent to the gas excitation cell for screening and collecting a specific optical signal emitted by gas excitation cell;

photosensitive element receives power supply through power supply pin on power supply driver board, and is used for converting the optical signal output by the spectral filter into an electrical signal;

amplifying board receives power supply through power supply pin on power supply driver board, and is used for receiving the electrical signal output by the photosensitive element group and amplifying it;

the data acquisition unit receives power supply through power supply pin on power supply driver board, and is used for acquiring, processing and storing the electrical signal data output by amplifying board.

2. Tesla Photoionization Detector, according to claim 1, is characterized in that gas excitation cell is a closed clean optical cavity, and the gas to be measured flows through gas excitation cell and is excited into a plasma state by high-frequency high-voltage electricity.

3. Tesla Photoionization Detector, according to claim 2, is characterized in that low-voltage power supply negative terminal of power drive board is connected to a power source, and low-voltage power supply positive terminal on power drive board is connected to one end of primary coil.

4. Tesla Photoionization Detector, according to claim 3, is characterized in that power supply driver board is further provided with sensor for detecting the temperature and air pressure in the gas excitation cell.

5. Tesla Photoionization Detector, according to claim 4, is characterized in that the edge of gas excitation cell is sealed by using O-rings or metal gasket pairs.

\* \* \* \* \*